United States Patent
Keane et al.

(10) Patent No.: US 7,697,566 B2
(45) Date of Patent: Apr. 13, 2010

(54) METHOD AND APPARATUS FOR ENABLING TRANSPORT OF ETHERNET DATA OVER A SERIAL DIGITAL INTERFACE TRANSPORT SERVICE

(75) Inventors: Eugene Keane, Camarillo, CA (US); Wayne Snyder, Simi Valley, CA (US)

(73) Assignee: Video Products Group, Inc., Camarillo, CA (US)

( * ) Notice: Subject to any disclaimer, the term of this patent is extended or adjusted under 35 U.S.C. 154(b) by 1042 days.

(21) Appl. No.: 11/324,285

(22) Filed: Dec. 30, 2005

(65) Prior Publication Data

US 2007/0153784 A1 Jul. 5, 2007

(51) Int. Cl.
*H04J 3/16* (2006.01)
*H04N 5/91* (2006.01)
(52) U.S. Cl. ............... 370/466; 370/473; 386/95
(58) Field of Classification Search ............ None
See application file for complete search history.

(56) References Cited

U.S. PATENT DOCUMENTS

| | | | |
|---|---|---|---|
| 2003/0085997 A1* | 5/2003 | Takagi et al. | 348/143 |
| 2004/0090995 A1* | 5/2004 | Kang et al. | 370/535 |
| 2004/0246981 A1* | 12/2004 | He et al. | 370/419 |
| 2004/0264961 A1* | 12/2004 | Nam et al. | 398/58 |
| 2005/0063707 A1* | 3/2005 | Imai | 398/141 |
| 2005/0141623 A1* | 6/2005 | Cho et al. | 375/240.28 |
| 2006/0051054 A1* | 3/2006 | Ino | 386/46 |
| 2007/0061414 A1* | 3/2007 | Bakke | 709/217 |
| 2007/0143801 A1* | 6/2007 | Madonna et al. | 725/80 |

\* cited by examiner

*Primary Examiner*—Ricky Ngo
*Assistant Examiner*—Clemence Han
(74) *Attorney, Agent, or Firm*—Paul D. Chancellor, Esq.; Jackson, DeMaro, Tidus & Packenpaugh

(57) ABSTRACT

A method and apparatus enables Ethernet data transport over a serial digital interface network. An Embedder/DeEmbedder for embedding Ethernet derived data and for de-embedding Ethernet derived data supports selective use of the active video region of the SDI frame and the unused HANC space for transporting Ethernet media independent interface data.

9 Claims, 2 Drawing Sheets

METHOD AND APPARATUS FOR ENABLING TRANSPORT OF ETHERNET DATA OVER A SERIAL DIGITAL INTERFACE TRANSPORT SERVICE

BACKGROUND OF THE INVENTION

1. Field of the Invention

The present invention relates to the electrical arts and to the transport of Ethernet data. More particularly, this invention relates to methods and apparatus for enabling transport of Ethernet data over a serial digital interface transport service.

2. Description of Related Art

Networks for transporting Ethernet data are known in office and business environments for communicating digital data. Such networks are termed local area networks (LAN) because Ethernet data may transmitted only over short distances, typically less than one kilometer. Data transport over longer distances and in particular between LAN's is accomplished using long distance communications means such as a link to a wide area network (WAN).

The exchange of video content among distant parties prompted the creation of a means to transport digitized video over considerable distances using a network with a Serial Digital Interface (SDI). Digital video signals are therefore typically transmitted over the SDI transport according to one or more SDI standards.

SDI signals are self-synchronizing, typically using 8 bit or 10 bit data words and a data rate of 270 Mbit/sec. Blocks of data words transmitted according to the SDI standard are referred to as frames. An SDI frame includes an active video region and inactive ancillary spaces including a horizontal (HANC) space.

Some offices have both an Ethernet LAN and a link to an SDI network. These offices would benefit from a method and means for transmitting Ethernet data over the SDI link. However, traditional SDI links will not transport Ethernet data signals.

SUMMARY OF THE INVENTION

The present invention satisfies a long felt need to enhance the utilization of SDI video transport services by enabling the transport of Ethernet and other data services including video data transport over SDI networks.

A preferred embodiment of the present invention includes an Embedder/De-Embedder that enables the transfer of Ethernet data over the SDI network. In particular, an Embedder function of the preferred embodiment uses a physical level Ethernet device (PHY) to convert the raw Ethernet data traffic into Media Independent Interface (MII) Data.

A Field-Programmable Gate Array (FPGA), a type of logic chip that can be programmable, is specifically programmed to place the MII data into the active video region of the SDI frame. The SDI frame with its embedded Ethernet data is then transported over standard SDI equipment and routed to another Embedder/De-Embedder apparatus.

When the embedded data reaches its destination, a second Embedder/De-Embedder and in particular the De-Embedder then extracts the Ethernet MII data and passes it to another PHY device. The PHY device then transmits the physical level Ethernet data.

To the Ethernet signal and all protocols that ride on it, the apparatus of the present invention appears to be a standard cable. But, the transport means is an SDI network and what is transported is media independent interface data derived from the Ethernet data or Ethernet MII data. In other words the present invention does not interact at either the OSI Data Link or Transport layer or at any higher layers in the OSI Reference Model.

In another embodiment of the invention, the Embedder/Deembedder apparatus is similar, but here the FPGA is also programmed to place the Ethernet MII data into the unused Horizontal Ancillary (HANC) data space of the SDI frame. This allows the use of one or both of the active video region and the HANC space to transport Ethernet MII data. Consequently, in this embodiment the SDI transport is capable of carrying both video and Ethernet data simultaneously.

BRIEF DESCRIPTION OF DRAWINGS

The novel features of this invention will be best understood from the accompanying drawings, taken in conjunction with the accompanying description, in which similar characters refer to similar parts and in which.

DESCRIPTION OF THE PREFERRED EMBODIMENTS

Figure 1:
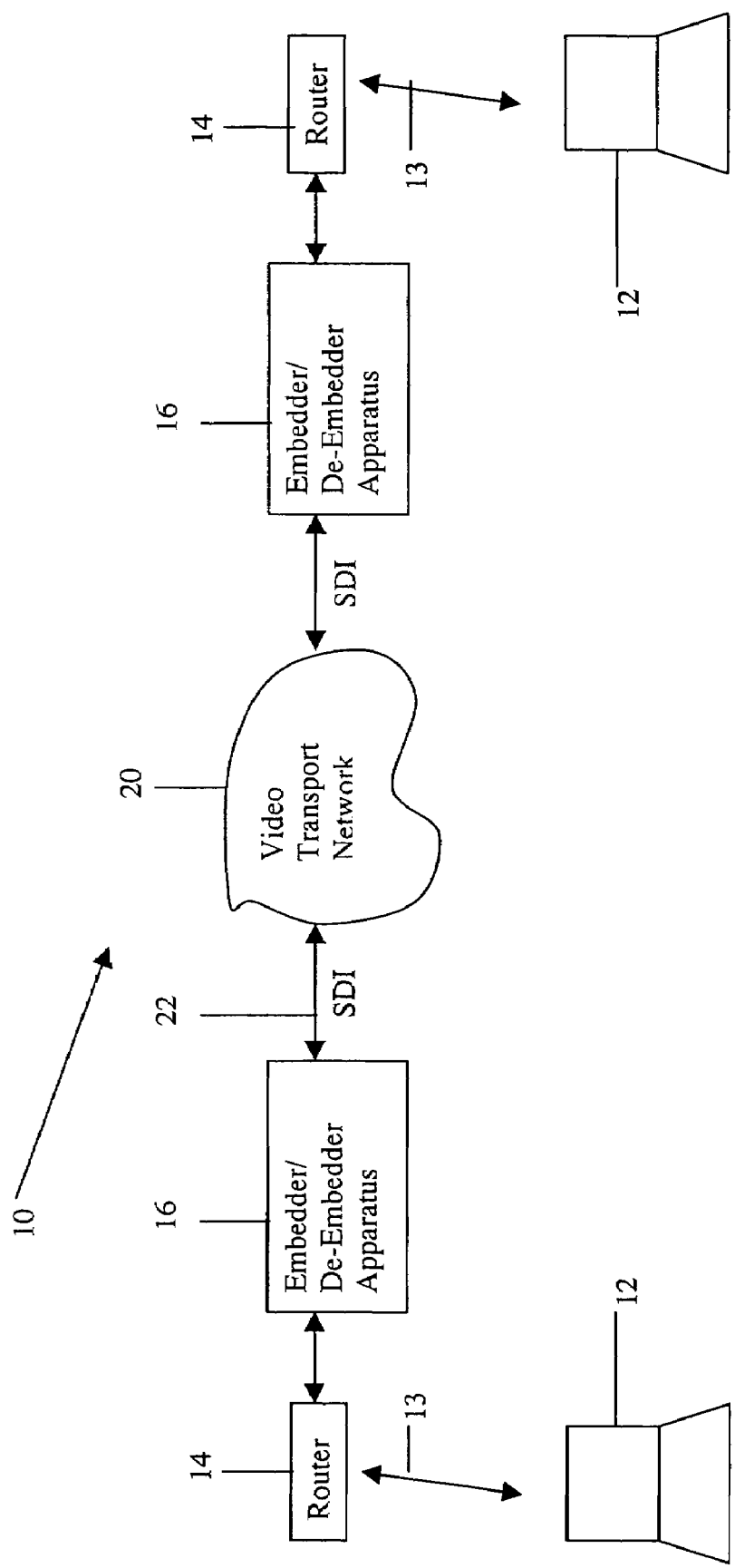
FIG. 1 is a block diagram of the data transport apparatus of the present invention.

FIG. 1 shows a block diagram of a network system 10. Ethernet data is transferred between two host computers 12 via an SDI video transport network 20. When Ethernet data 13 is sent from one computer 12 and routed via a router 14, it encounters the Embedder/De-Embedder apparatus 16 of the present invention.

The Ethernet data 13 is typically carried at speeds of 10M and 100M. In an embodiment, 1G and 10G Ethernet may also be transported over the SDI network but throughput would be limited because of the lower data rate (270 Mbits/sec) of the SDI network. It should be noted that when both video and Ethernet are carried simultaneously, maximum Ethernet throughput is reduced since the Ethernet and video data share the available SDI bandwidth.

Figure 2:
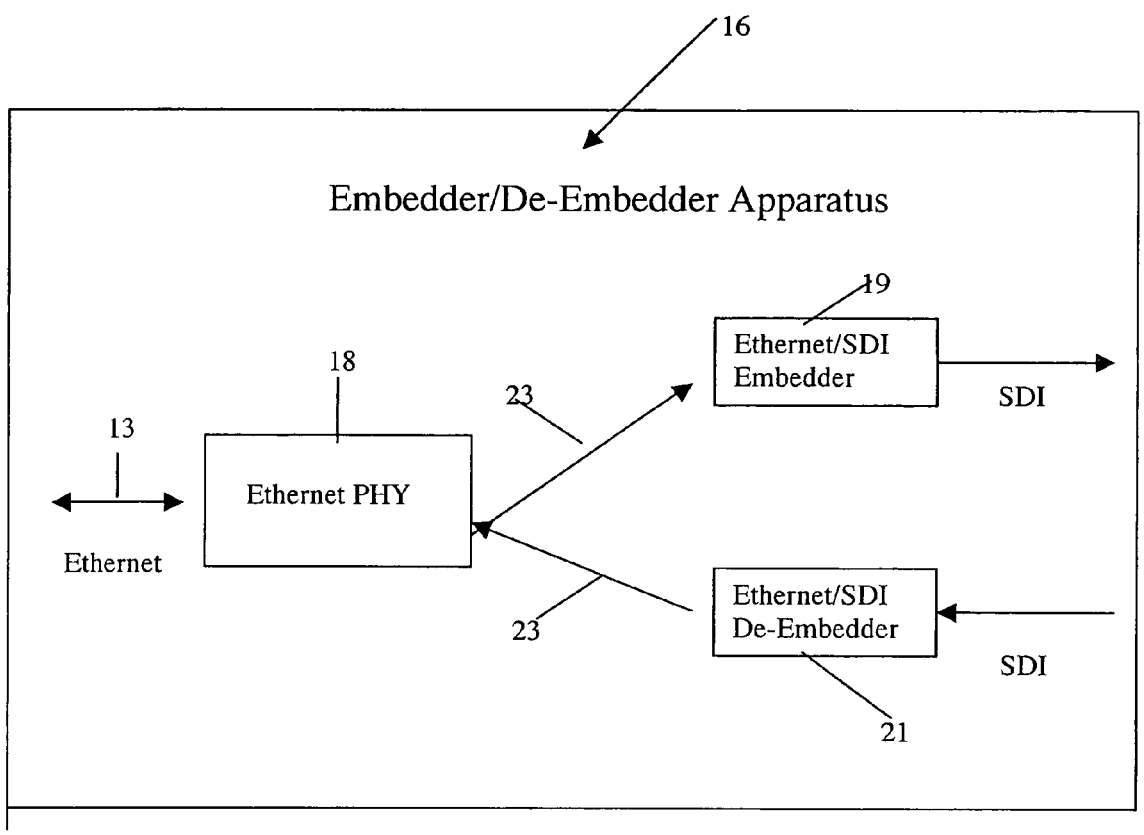
FIG. 2 is a block diagram of the Embedder/DeEmbedder of the data transport apparatus of FIG. 1.

FIG. 2 shows a block diagram of the Embedder/De-Embedder apparatus 16. The Embedder/De-Embedder apparatus 16 includes a data converter or PHY 18, an Ethernet/SDI Embedder 19, and an Ethernet/SDI De-Embedder 21.

In an embodiment, the data converter, the Ethernet/SDI Embedder, and the Ethernet/SDI De-Embedder are contained in a common enclosure 30 and in some embodiments, all of these devices are implemented on a single circuit board.

Upon receipt of the Ethernet data 13 through the router 14, the data converter 18 of the Embedder/De-Embedder apparatus 16 converts the raw Ethernet data 13 into Ethernet MII data 23. The Ethernet MII data 23 is then embedded by the Ethernet/SDI Embedder 19. In an embodiment, one or more field programmable gate arrays are associated with the Embedder/DeEmbedder and it is an FPGA that places this data into the active video region of the SDI frame. Here, the FGPA is programmed to perform the operation of placing the data into the active video region.

The data converter 18 has logic levels that are compatible with a selected FPGA. Any appropriate data converter interface may be used such as Intel's model LXT972A. In addition, FPGA devices are known in the industry, and any FPGA having sufficient size and speed may be used such as the Altera Cyclone FPGA.

The SDI frame with the embedded Ethernet MII data is transported over standard SDI cables 22 through the Video Transport Network 20 and routed via second router 14 to another Embedder/De-Embedder apparatus 16. As the SDI frame 23 enters the Embedder/De-Embedder apparatus 16, the Ethernet/SDI De-Embedder 21 extracts the incoming Ethernet MII data 23 and passes it to another data converter 18. The data converter 18 transmits the physical level Ethernet data 13 to the second host computer 12.

In another embodiment of the present invention, the FPGA is programmed to selectively place video or Ethernet MII data into the active video region of the SDI frame and Ethernet MII data into the unused HANC space of the SDI frame. In this embodiment, the SDI transport can carry one or both of video and Ethernet MII data. In particular, video and Ethernet MII data may be carried simultaneously.

In an embodiment where Ethernet MII data is carried only in the HANC space of the SDI frame, the throughput is about 4.1 Mbytes/sec. Therefore, 10M Ethernet may be transported in this embodiment without flow control while 100M Ethernet would require the use of flow control.

While various embodiments of the present invention have been described above, it should be understood that they have been presented by way of example only, and not limitation. It will be understood by those skilled in the art that various changes in form and details can be made therein without departing form the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An apparatus for enabling transport of Ethernet derived data over a serial digital interface video transport service comprising:
    an embedder for embedding Ethernet derived data into a serial digital interface frame;
    a de-embedder for de-embedding Ethernet derived data that is embedded in a serial digital interface frame;
    a data converter operably connected to the embedder for converting Ethernet data to Ethernet derived data embeddable in said serial digital interface frame;
    wherein the data converter is operably connected to the de-embedder for converting Ethernet derived data into Ethernet data; and,
    wherein the embedder embeds data derived from Ethernet data into an active video region of the serial digital interface frame.

2. The apparatus of claim 1, wherein the embedder embeds data derived from Ethernet data into a horizontal ancillary (HANC) data space of the serial digital interface frame.

3. The apparatus of claim 1, wherein the embedder embeds data derived from Ethernet data into a horizontal ancillary (HANC) data space of the serial digital interface frame.

4. The apparatus of claim 1, wherein the data converter is a field programmable gate array device.

5. The apparatus of claim 4 wherein the embedder, the de-embedder and the data converter are contained within a common enclosure.

6. An apparatus for transporting data over a serial digital interface video transport service comprising:
    an embedder operably connected to a field programmable gate array device said embedder for embedding Ethernet data received and processed by said field programmable gate array device into a serial digital interface frame;
    a de-embedder operably connected to a field programmable gate array device said de-embedder for de-embedding data embedded in a serial digital interface frame and said field programmable gate array device for converting said de-embedded data for use in an Ethernet data network; and,
    wherein the embedder embeds the Ethernet data received and processed by the media independent interface into an active video region of the serial digital interface frame.

7. The apparatus of claim 6, wherein the embedder embeds Ethernet data received and processed by the media independent interface into a horizontal ancillary (HANC) data space of the serial digital interface frame.

8. The apparatus of claim 6, wherein the embedder embeds Ethernet data received and processed by the media independent interface into a horizontal ancillary (HANC) data space of the serial digital interface frame.

9. A method of transmitting Ethernet data between two or more hosts comprising the steps of:
    acquiring Ethernet data from one of said hosts and embedding Ethernet derived data into an active video region of a serial digital interface frame;
    transporting said Ethernet derived data over a serial digital interface transport service;
    de-embedding the Ethernet derived data from the serial digital interface frame;
    utilizing Ethernet data derived from said Ethernet derived data in an Ethernet network; and,
    embedding Ethernet derived data into a horizontal ancillary data space (HANG) of the serial digital interface frame.

* * * * *